United States Patent [19]

Katz et al.

[11] Patent Number: 4,983,472
[45] Date of Patent: Jan. 8, 1991

[54] FUEL CELL CURRENT COLLECTOR

[75] Inventors: Murray Katz, Newington; Stanley P. Bonk, West Willington; Donald L. Maricle; Martin Abrams, both of Glastonbury, all of Conn.

[73] Assignee: International Fuel Cells Corporation, South Windsor, Conn.

[21] Appl. No.: 440,923

[22] Filed: Nov. 24, 1989

[51] Int. Cl.$^5$ .............................................. H01M 8/24
[52] U.S. Cl. ........................................ 429/38; 429/39
[58] Field of Search ................................... 429/38, 39

[56] References Cited

U.S. PATENT DOCUMENTS

| | | |
|---|---|---|
| 1,362,289 | 12/1920 | Grieb . |
| 1,549,748 | 8/1925 | Dane . |
| 3,758,342 | 9/1973 | Baba ................................. 136/86 A |
| 4,169,917 | 10/1979 | Baker et al. ............................ 429/39 |
| 4,401,530 | 8/1983 | Clere ....................................... 204/98 |
| 4,411,968 | 10/1983 | Reiser et al. ........................... 429/41 |
| 4,548,876 | 10/1985 | Bregoli .................................... 429/39 |

*Primary Examiner*—Donald L. Walton
*Attorney, Agent, or Firm*—Edward L. Kochey, Jr.

[57] ABSTRACT

A fuel cell has a current collector plate (22) located between an electrode (20) and a separate plate (25). The collector plate has a plurality of arches (26, 28) deformed from a single flat plate in a checkerboard pattern. The arches are of sufficient height (30) to provide sufficient reactant flow area. Each arch is formed with sufficient stiffness to accept compressive load and sufficient resiliently to distribute the load and maintain electrical contact.

19 Claims, 3 Drawing Sheets

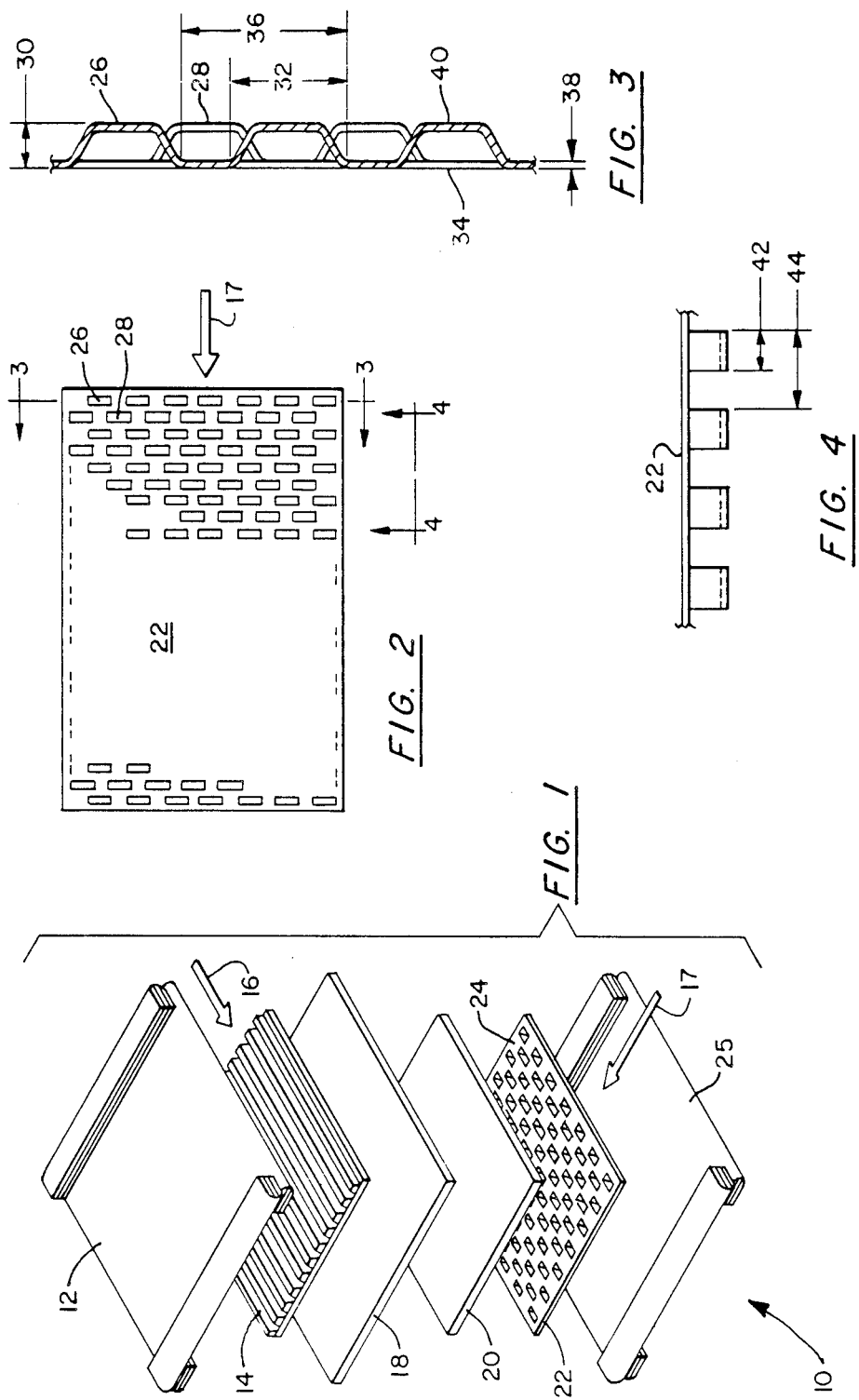

FUEL CELL CURRENT COLLECTOR

The Government has rights in this invention pursuant to a contract awarded by the Department of Energy.

TECHNICAL FIELD

The invention relates to fuel cell current collectors and in particular to a collector appropriate for use with frangible electrodes.

BACKGROUND OF THE INVENTION

A fuel cell stack is comprised of a plurality of individual fuel cells which are stacked in electrical series relationship. A separator plate separates each fuel cell. An electrode such as an anode is adjacent separator plate followed by a matrix which includes electrolyte. Beyond the matrix is another electrode in the form of a cathode followed by another separator plate. Arrangements are made to pass reactants in the form of fuel and oxidant through open spaces provided between the separator plates and a corresponding electrode.

The electrolyte diffuses through the electrode so that a reaction takes place between the fuel and the electrolyte on the surface of one electrode while another reaction takes place between the oxidant and the electrolyte at the surface of the other electrode. These reactions and the details of the electrodes and the electrolyte as well as the matrix holding the electrolyte are well discussed in the prior art.

Material selection for each of the components is limited by the corrosion resistance of the material to the particular substance in the fuel cell as well as the temperature level at which the fuel cell is operating. Each component used must therefore be selected of a material which will resist corrosion.

In accordance with the fuel cell chemical reaction, a flow of electrons must occur between adjacent fuel cells. Accordingly, the components must provide good electrical conductivity to facilitate the flow without heating loss and must also be in good electrical contact to pass the current.

An axial compressive load must be maintained on the stack for the purpose of maintaining appropriate contact throughout the cell throughout temperature transients and differential expansion in different areas.

In molten carbonate cells, the cathode tends to be frangible and rubble like. The more common means of providing a gas flow path between the separator and electrode cannot be used. Electrodes manufactured with grooves extending therethrough to provide this gas space have insufficient strength to survive.

It is also noted that the reactant must not only obtain access to the gas space, but must pass through the gas space in a continuous flow. In order to avoid inappropriately high pressure drops and velocities, adequate flow area must be achieved. This must be obtained in such a way that the gas has reasonable access to the electrode itself without significant blanking of the electrode by any apparatus which may be in contact with it.

In prior art molten carbonate cells the cathode has presented a particular problem. A current collector for passing the electrons from the cathode to the separator plate must be supplied, and supplied in a manner to permit gas access to the cathode and sufficient flow space to achieve an appropriately low pressure drop.

In the prior art, a perforated plate having a substantially flat surface is located in contact with the cathode to provide support and good electrical contact. A folded kintex piece which is generally in the form of a metal corrugation with openings therethrough is located between the perforated plate and the separator. This provides passage for the reactant gas such an arrangement requires multiple pieces usually with a material requirement which is 2.6 times the area of the cathode. It also requires additional vertical space since in addition to the flow area blocked by the kintex, the thickness of the perforated plate exists which is not available for transverse flow. It furthermore has an additional electrical contact joint between the perforated plate and the kintex.

As described before, the fuel cell is under compression at a loading of at least 170 kilopascals. The current collector should have a sufficient flexibility to maintain contact over temperature transients and flexibility to accept manufacturing tolerances. It also must adequately accept this load without excessive creep.

SUMMARY OF THE INVENTION

A fuel cell has a plurality of separator plates and a plurality of electrodes. A current collector is located between an electrode and separator plate. A planar surface of the collector plate abut the electrode, and a plurality of arches deformed from the plate abut the separator plate. With the fuel cell under axial compression, these arches resist the load, maintain electrical contact and provide a reactant flow path.

Each arch has legs at an obtuse angle with respect to the planar plate and a slightly arcuate beam substantially parallel to the plate. They are arranged in a checkerboard pattern and located transverse to the reactant flow.

BRIEF DESCRIPTION OF THE DRAWINGS

FIG. 1 is an exploded view of one cell of a fuel cell assembly;

FIG. 2 is a plan view of the collector plate;

FIG. 3 is a sectional view through 3—3 of FIG. 2;

FIG. 4 is a sectional through 4—4 of FIG. 2;

DESCRIPTION OF THE PREFERRED EMBODIMENT

Figure 7:
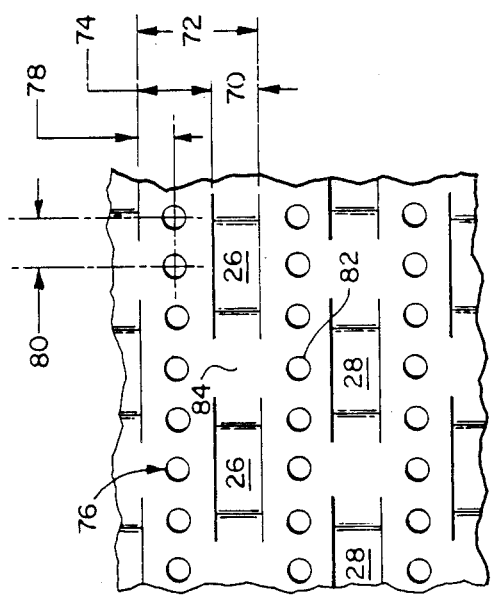
FIG. 7 is an expanded plan view of a portion of the collector plate of an alternate embodiment.

In FIG. 1 there is shown a fuel cell 10 with separator plate 12 located between fuel cell 10 and adjacent cell. A conventional anode 14 is formed with longitudinally extending grooves, a matrix 18 containing electrolyte is in contact with anode 14. Fuel 16 flows between the anode and the separator plate.

Cathode 20 is also in contact with the electrolyte but this cathode is formed of Nickel which is oxidized to Nickel Oxide, and which is frangible and a rubble-like substance. This is incapable of being formed as is anode 14, and is accordingly flat on both sides. Collector plate 22 has a planar surface 24 in contact with the cathode. The raised arches discussed hereinafter are in contact with the next separator plate 25. Oxidant 17 flows between cathode 20 and the separator plate. This is followed by a repeating cell of identical structure.

The current collector 22 shown in FIG. 2 and formed of 0.25 mm thick type 310 stainless steel, has an overall size of 30 cm by 27 cm. Other materials which can survive in this environment include type 316 stainless steel and Incoloy 825. A plurality of arches 26 and 28 are formed by deforming the plate material. Each arch has a nominal height 30 from the surface of the plate of 1.63 mm. The overall length 32 of each punched opening and accordingly slot 34 formed thereby is 4.83 mm. These are established at a pitch 36 of 6.22 mm. The plate thickness 38 is 0.25 mm.

It can be seen that the various arches 26 and 28 are located at alternate locations in adjacent rows thereby forming a checkerboard pattern. They are also located with the beam portion 40 of each arch perpendicular to the direction of reactant flow 17 passing through the current collector and in the gas space between the cathode and the separator plate. This provides a lower flow pressure drop condition. The width of each arch 42 is 1.52 mm and the pitch 44 in this transverse direction is 2.95 mm.

The total punched area is 40 percent of the plate area, and should preferably be between 30 and 45 percent.

It can be seen that the maximum unsupported width of the electrode at any location is 1.52 mm. With such a frangible and rubble like electrode it is important to maintain this distance at a minimum, which will vary depending on the properties of the particular electrode. As a general rule it should not exceed this width of 1.52 mm.

Figure 5:
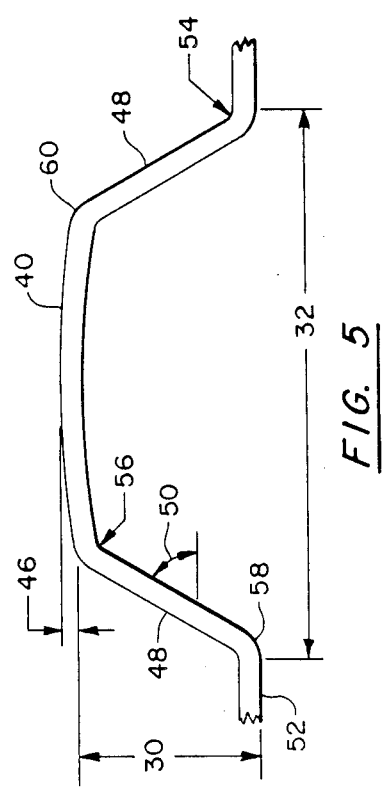
FIG. 5 is an expanded view of an arch of the collector plate.

In FIG. 5 a cross section of the arch is seen in more detail. The nominal overall height 30 of 1.63 mm is shown. The beam 40 of the arch has a slight arcuate form extending a dimension 46 of 0.008 mm toward the separator plate. This should preferably not exceed 5 percent of the span of beam 40.

Each leg 48 of the arch extends upwardly at an angle 50 of 60 degrees with respect to planar surface 52. As described before the fuel cell assembly is under a compressive load of at least 1.58 kilopascals per square cm. This angle 50 preferably should be at least 50 degrees to provide appropriate stiff support while an angle exceeding 70 degrees makes it difficult, if not impossible, to form the beam from the material originally in line with planar surface 52. The beam is formed with a radius 54 of 0.75 mm and the interface between the leg 48 and the beam 40 also has a radius 56 of 0.75 mm.

The leg 48 is to be stiff to accept the appropriate compressive loading. The bends 58 and 60, however, are provided with the radius which permits flexibility in the arch under heavy loading to maintain substantial compressive contact at all times. The slight bow 46 in the beam provides much softer spring which maintains the electrical contact with the separator plate even with the relaxation of load that could not be followed by the flexibility of the overall structure.

Figure 6:
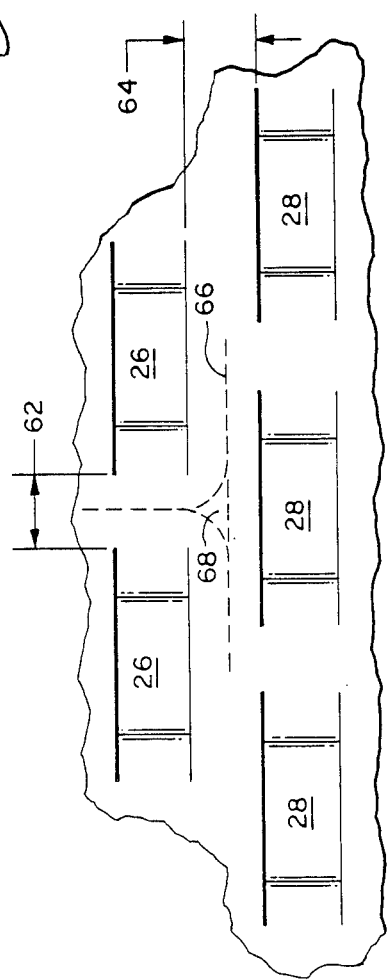
FIG. 6 is an expanded plan view of a portion of the collector plate.

FIG. 6 is a greatly expanded view of a portion of the collector plate. Arches 26 and 28 are shown and the previously described length and pitch of the arches provides a distance 62 of 1.40 mm. With the earlier described arch width of 1.52 mm and a pitch of 2.95 mm the dimension 64 between adjacent arches is 1.43 mm.

The dotted line 66 illustrates the blocked portion where the gas cannot contact the electrode which is a distance of approximately 0.7 mm from the closest gas space. With a sufficiently thick electrode the gas can reasonably be expected to flow without excessive losses to the blocked portion of the electrode. It is noted that the triangle 68 is a portion of the arrangement where the blockage exceeds this 0.7 mm distance.

Particularly where a thin electrode is used, modifications can be made to minimize this blocked space because transport is more difficult. Such an arrangement is shown in the alternate collector plate embodiment of FIG. 7 where the open area is 38 percent of the plate area. Each arch 26 and 28 again has an overall width 70 of 1.5 mm. The earlier described dimensions in the direction parallel to the beams are maintained. The pitch 72 of the arches is, however, increased to 3.81 mm. The space 74 between adjacent rows of arches is now 2.29 mm. A plurality of punched holes 76 having a diameter of 0.75 mm are supplied with there being four holes for each arch. The center of each hole therefore is a distance 78 of 1.14 mm from the centerline to an adjacent slot. The pitch of the individual holes 80 is 1.6 mm.

It should be noted in particular that hole 82 is located even with the center of the adjacent land 84 between adjacent in-line arches. This hole is located in the area of the critical space 68 shown in FIG. 6.

Figure 8:
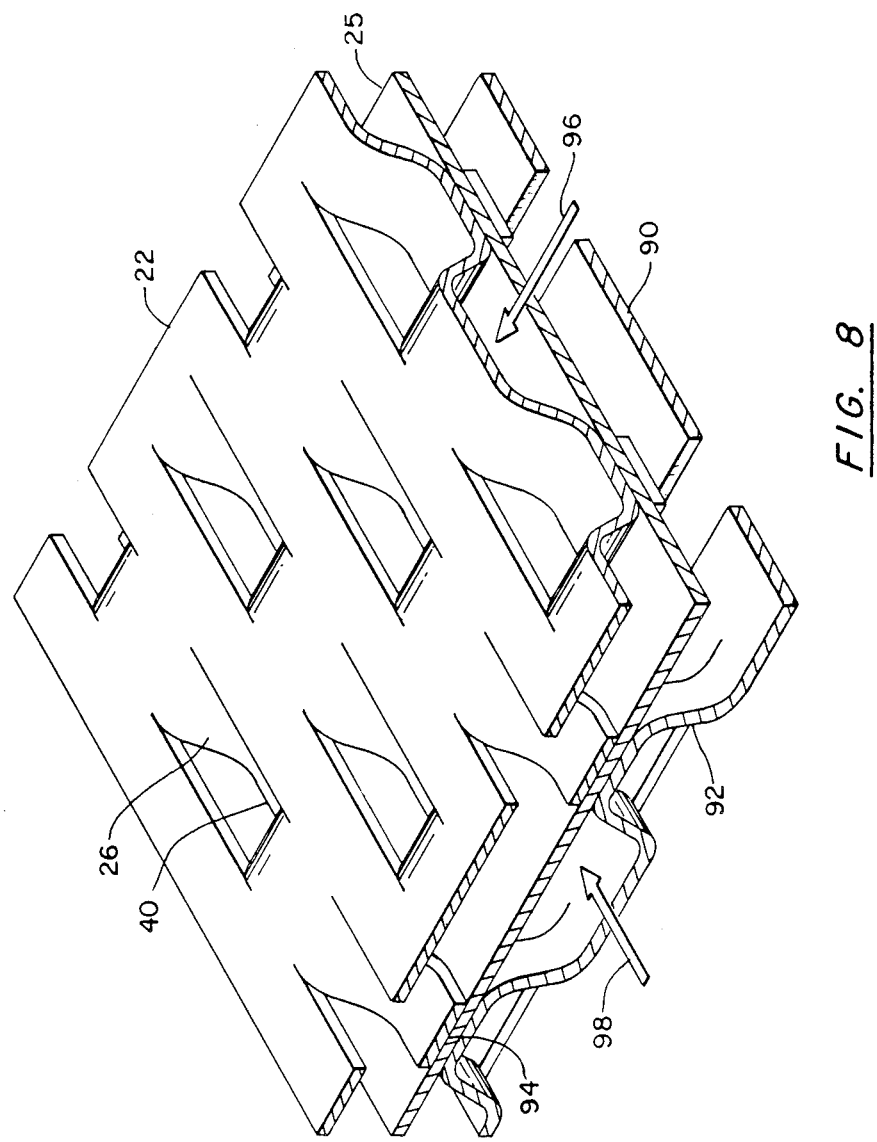
FIG. 8 illustrates an alternate embodiment where a collector plate is located adjacent both the cathode and anode.

FIG. 8 illustrates an alternate embodiment where a collector plate is located adjacent both the cathode and anode. Cathode collector plate 22 has arches 26 with beams 40 abutting separator plate 25.

Anode collector plate 90 has arches 92 with beams 94 abutting separator plate 25. Beams 40 and 92 are located coaxially with respect to the fuel cell axis. The compressive loading is thereby resisted without bending of the separator plates.

Beams 40 and 92 are located with the length of each beam perpendicular to reactant flows 96 and 98 respectively. Pressure drop of the reactant flow is thereby minimized.

The collector plate of one piece construction stamped from a flat plate requires no double thickness portions which would restrict reactant flow. Solid and continuous electrical contact is maintained, even during thermal transients. The reactant passages present a low pressure drop to the flow passing therethrough.

We claim:

1. A current collector, for location between an electrode and a separator plate of a fuel cell having a plurality of separator plates, a plurality of electrodes, and means for supplying reactant between each electrode and separator plate comprising:

a plate having a planar surface contactable with an electrode;

a plurality of deformed arches formed by deforming plate material and thereby forming a plurality of punched slots in said planar surface; and each of said deformed arches having a pair of support legs at an obtuse angle with respect to said planar surface and a beam substantially parallel to said planar surface, the beam of each arch being contactable with a separator plate.

2. A current collector as in claim 1 each beam having a slight arcuate form extending away from said planar surface.

3. A current collector as in claim 2 said arcuate form extending not more than 5 percent of the span of said beam.

4. A current collector as in claim 1 said plurality of deformed arches located in alternate locations in adjacent rows forming a checkerboard pattern.

5. A current collector as in claim 1
said plurality of deformed arches locatable with the length of said beam perpendicular to the flow of reactant across the current collector.

6. A current collector as in claim 1
the area of said punched slots being between 30 and 45 percent of the total area of said planar surface.

7. A current collector as in claim 1
the maximum width of said punched slots being 1.52 mm.

8. A current collector as in claim 1
the maximum blocked distance from any contact point of the adjacent electrode to a punched slot being less than 1 mm.

9. A current collector as in claim 1
each beam having a slight arcuate form extending; and
said plurality of deformed arches located in alternate locations in adjacent rows forming a checkerboard pattern.

10. A current collector as in claim 9
said plurality of deformed arches locatable with the length of said beam perpendicular to the flow of reactant across the current collector;
the area of said punched slots being between 30 and 45 percent of the total area of said planar surface;
the maximum width of said punched slots being 1.52 mm; and
the maximum blocked distance from any point of the planar surface to a punched slot being less than 1 mm.

11. A current collector as in claim 2
said plate having a plurality of holes in said planar surface;
said holes located in substantially linear arrays between adjacent rows of arches.

12. A current collector as in claim 11
said holes having a diameter not exceeding 0.75 mm.

13. A fuel cell comprising:
a plurality of separator plates;
a plurality of anodes;
a plurality of cathodes;
means for supplying reactant between each electrode and separator plate a current collector for location between an electrode and a separator plate;
a plurality of anode current collectors, each for location between each anode and the adjacent separator plate, each anode current collector comprising:
an anode plate having a planar surface adjacent and in contact with an anode;
a plurality of deformed anode collector plate arches formed by deforming plate material and thereby forming a plurality of punched slots in said planar surface, and
each of said deformed anode collector plate arches having a pair of support legs at an obtuse angle with respect to said planar surface an an anode collector beam substantially parallel to said planar surface, the beam of each arch being in contact with the adjacent separator plate.

14. A fuel cell as in claim 13
a plurality of cathode current collector plates, each for location between each cathode and the adjacent separator plate, each cathode collector plate comprising;
a cathode plate having a cathode planar surface adjacent and in contact with a cathode;
a plurality of deformed cathode collector plate arches formed by deforming plate material and thereby forming a plurality of punched slots in said cathode planar surface, and
each of said deformed cathode collector plate arches having a pair of support legs at an obtuse angle with respect to said cathode planar surface, and a cathode collector beam substantially parallel to said cathode planar surface, the beam of each arch being in contact with the adjacent separator plate.

15. A fuel cell as in claim 14
each of said anode collector beams and said cathode collector beams being coaxially located with respect to the fuel cell axis, whereby compressive loading is resisted without bending of the separator plates.

16. A fuel cell as in claim 15
said plurality of deformed anode arches and said cathode arches each located in alternate locations in adjacent rows forming a checkerboard pattern.

17. A fuel cell as in claim 16
said plurality of deformed anode arches and said plurality of cathode arches each located with the length of their respective beam perpendicular to the flow of reactant across the respective current collectors.

18. A fuel cell as in claim 17
each beam having a slight arcuate form extending toward said separator plate.

19. A fuel cell as in claim 18
the area of said punched slots being between 30 and 45 percent of the total area of said planar surface.

* * * * *